(12) United States Patent
Jayawardena et al.

(10) Patent No.: US 7,752,666 B2
(45) Date of Patent: Jul. 6, 2010

(54) DETECTION OF ROUTING LOOPS BASED ON TIME-TO-LIVE EXPIRIES

(75) Inventors: Thusitha Jayawardena, Holmdel, NJ (US); William J. Shugard, Berkley Heights, NJ (US)

(73) Assignee: AT&T Labs, Inc., Austin, TX (US)

( * ) Notice: Subject to any disclaimer, the term of this patent is extended or adjusted under 35 U.S.C. 154(b) by 140 days.

(21) Appl. No.: 11/963,039

(22) Filed: Dec. 21, 2007

(65) Prior Publication Data

US 2009/0161567 A1 Jun. 25, 2009

(51) Int. Cl.
*G06F 11/00* (2006.01)
(52) U.S. Cl. .......................................... 726/23; 370/351
(58) Field of Classification Search ........................ None
See application file for complete search history.

(56) References Cited

U.S. PATENT DOCUMENTS

| 5,014,262 | A | 5/1991 | Harshavardhana |
| 5,371,732 | A | 12/1994 | Brocken et al. |
| 6,363,384 | B1 | 3/2002 | Cookmeyer, II et al. |
| 6,501,754 | B1 | 12/2002 | Ohba et al. |
| 6,526,044 | B1 | 2/2003 | Cookmeyer, II et al. |
| 6,529,954 | B1 | 3/2003 | Cookmeyer, II et al. |
| 2003/0145232 | A1* | 7/2003 | Poletto et al. ............... 713/201 |
| 2006/0013143 | A1* | 1/2006 | Yasuie et al. ................ 370/249 |

OTHER PUBLICATIONS

U. Hengartner, S. Moon, R. Mortier, C. Diot, "Detection and Analysis of Routing Loops in Packet Traces," Proceedings of 2nd Internet Measurement Workshop (IMW 2002), Marseille, France, pp. 107-112, Nov. 2002.

* cited by examiner

*Primary Examiner*—Chi H Pham
*Assistant Examiner*—Fan Ng
(74) *Attorney, Agent, or Firm*—Hoffmann & Baron, LLP

(57) ABSTRACT

A method and system for detecting routing loops and time-to-live (TTL) expiry attacks in a telecommunications network are disclosed. The detection of routing loops and TTL expiry attacks can be achieved based on the comparison of TTL expiries occurring on two or more routers in the network. A quantity of TTL expiries associated with a router can be summed. Additionally, a quantity of TTL expiries associated with other routers that are operatively coupled to the router can be summed. A difference between the sums can be calculated and a determination of whether a routing loop exists can be made in response to the difference.

17 Claims, 15 Drawing Sheets

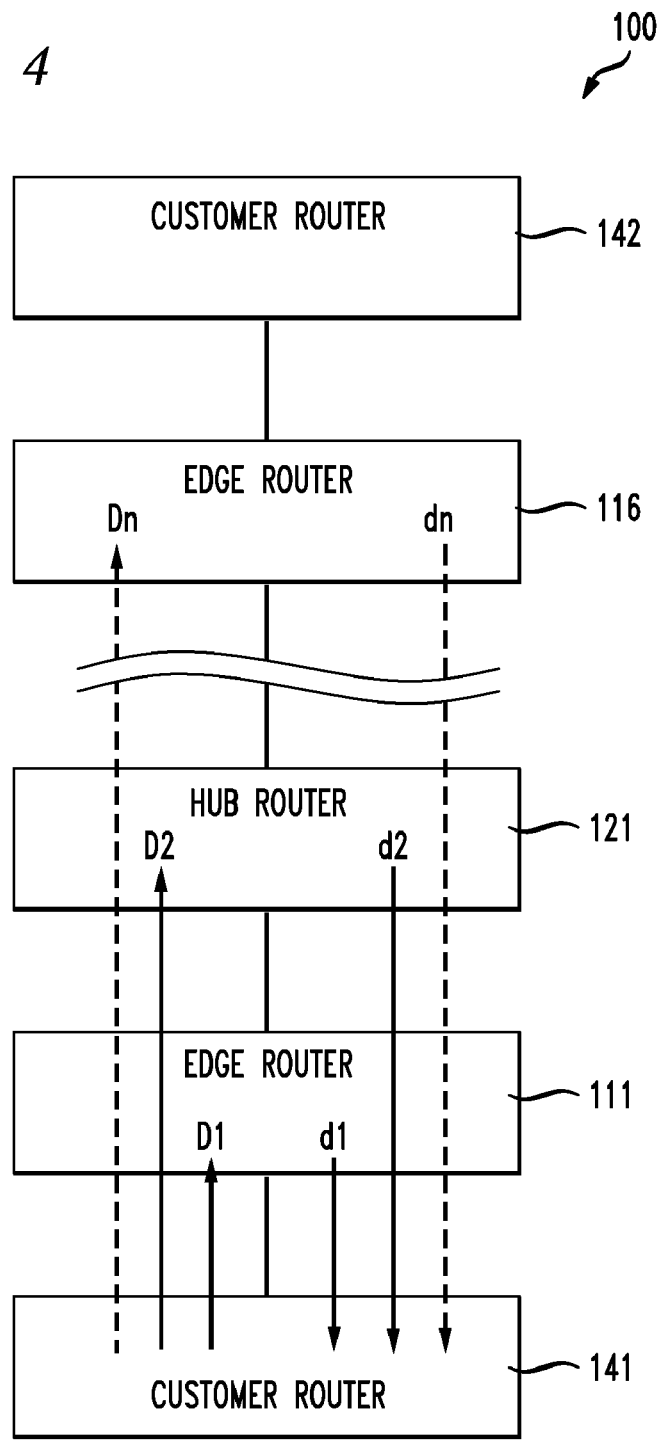

DETECTION OF ROUTING LOOPS BASED ON TIME-TO-LIVE EXPIRIES

BACKGROUND OF THE INVENTION

1. Field of the Invention

The present invention relates to detecting routing loops in a network and specifically to detecting routing loops in a network based on time-to-live (TTL) expiries.

2. Brief Description of the Related Art

Routing loops are inevitable in networks, such as Internet Protocol (IP) and Multi Protocol Label Switched (MPLS) networks. A routing loop occurs when a router incorrectly sends a data packet to a router through which the data packet already passed, thereby creating a circuitous path around which the data packet travels. Routing loops can be generally classified as transient or persistent. Transient routing loops last for a relatively short period of time (e.g., a few of seconds to a few minutes). Transient routing loops are typically caused by inconsistent routing among a set of routers that can occur subsequent to a network failure or configuration change. When the routing converges after such an event, these transient routing loops no longer exist.

Persistent routing loops in networks, such as IP and MPLS, can last for hours, days, or longer. These persistent routing loops are typically less common than transient routing loops, but tend to have a greater impact on network performance due to lost data traffic and wasted bandwidth. Persistent routing loops generally occur as a result of configuration errors, such as errors in a routing table, and hidden design vulnerabilities that are exposed only during failures. Due to the negative impacts of persistent routing loops, it is important for service providers to quickly detect and resolve these persistent routing loops. Relying on customer complaints to detect routing loops in a provider network is an undesirable approach.

Some conventional approaches to detecting routing loops can be classified as control plane and data plane methods. In control plane methods, routing tables from a set of routers are examined for routing inconsistencies and loops. These routing tables can include a large number of routes. For example, routing tables in "tier 1" Internet Service Provider (ISP) networks currently include about two hundred and fifty thousand routes. In large networks, routing changes can occur daily. As a result, validation of routing is required on a regular basis. This tends to be burdensome to service providers since large routing tables on many routers need to be examined for validation. Furthermore, such validation of routing does not guarantee loop-free routing. For example, while the control plane can be validated to ensure correct routing information, hardware or software malfunctions on a router could result in routing loops in the data plane.

Data plane methods for routing loop detection typically rely on sending probes to detect loops. For example, traceroute packets can be sent to validate loop-free routing. Such a method is generally only practical for small networks because even when a limited amount of probe traffic is sent from edge router to edge router, the number of edge router to edge router paths in medium to large networks is prohibitive. Another option is to send probes among a selected subset of edge routers. Although this would improve feasibility of this method, it does not ensure detection of routing loops associated with edge routers that are excluded from consideration.

SUMMARY OF THE INVENTION

Preferred embodiments are directed to detecting routing loops and time-to-live (TTL) expiry attacks in a network. The preferred embodiments can detect the routing loops and the TTL expiry attacks based on the TTL expiries occurring on two or more routers in the network. The routers in a network can be queried to obtain a quantity of TTL expiries associated with the routers during a given time interval.

In one embodiment, a method of detecting routing loops in a network is disclosed. The method includes determining whether a routing loop exists based on a relationship between a quantity of time-to-live (TTL) expiries associated with the at least one first router in a network and a quantity of TTL expiries associated with at least one second router in the network.

In another embodiment, a computer-readable storage medium is disclosed that includes instructions executable by at least one processing device for detecting a routing loop in a network. The instructions for detecting a routing loop include determining whether a routing loop exists based on a relationship between a quantity of TTL expiries associated with the at least one first router in a network and a quantity of TTL expiries associated with at least one second router in the network.

In a further embodiment, a system for detecting routing loops in a network having a plurality of routers is disclosed. The system includes a computing device configured to determine whether a routing loop exists based on a relationship between a quantity of TTL expiries associated with the at least one first router and a quantity of TTL expiries associated with at least one second router in the network.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 4 depicts the implementation of a traceroute operation in a network;

DETAILED DESCRIPTION OF THE PREFERRED EMBODIMENTS

Preferred embodiments are directed to detecting routing loops and time-to-live (TTL) expiry attacks in a network. TTL, as used herein, refers to a value associated with a data packet that is used to determine when the data packet expires. A TTL expiry attack occurs when one or more data packets have a TTL value that result in TTL expiries at the incoming interface of a router. A network, such as an Internet Protocol (IP) network or a Multi Protocol Label Switched (MPLS) network can include a number of routers through which customer routers can communicate. A general assumption is that TTL propagation is allowed in MPLS networks, however, when TTL propagation is not allowed in an MPLS network the approaches described herein are still valid. In the case where TTL propagation is not allowed, the problem of routing loop detection is easier since TTL expiries due to customer traceroute activity will not be present on the routers.

The preferred embodiments can detect the routing loops and the TTL expiry attacks based on a relationship, such as a difference, between TTL expiries occurring on two or more routers in the network. To achieve this, the preferred embodiments can query the routers in a network to obtain a quantity of TTL expiries occurring on incoming interfaces of the routers in a given time interval. For a given incoming interface of a router the quantity can be the difference between the TTL expiry counts at the end and beginning of the time interval. As used herein, TTL expiries occurring on the incoming interface refers to TTL expiries caused by packets entering the router via the given interface. The quantity of TTL expiries on the incoming interfaces of a router during a given time interval can be summed. Additionally, the quantity of TTL expiries occurring during the same time interval on incoming interfaces of other routers that are connected to the first router can be summed. The preferred embodiments can perform mathematical operations using the sums to detect a routing loop or a TTL expiry attack.

By using the sums of the TTL expiries on a router and on other routers connected to the router, the preferred embodiments can distinguish between traceroute activity, routing loops, or TTL expiry attacks. In addition, efficient detection of routing loops and TTL expiry attacks, as well as, separation of transient routing loops from persistent routing loops can be achieved using varying detection resolutions. For example, the preferred embodiments detect routing loops or TTL expiry attacks for a router and/or a group of routers. The preferred embodiments can determine which router or routers are involved in a routing loop.

Figure 1:
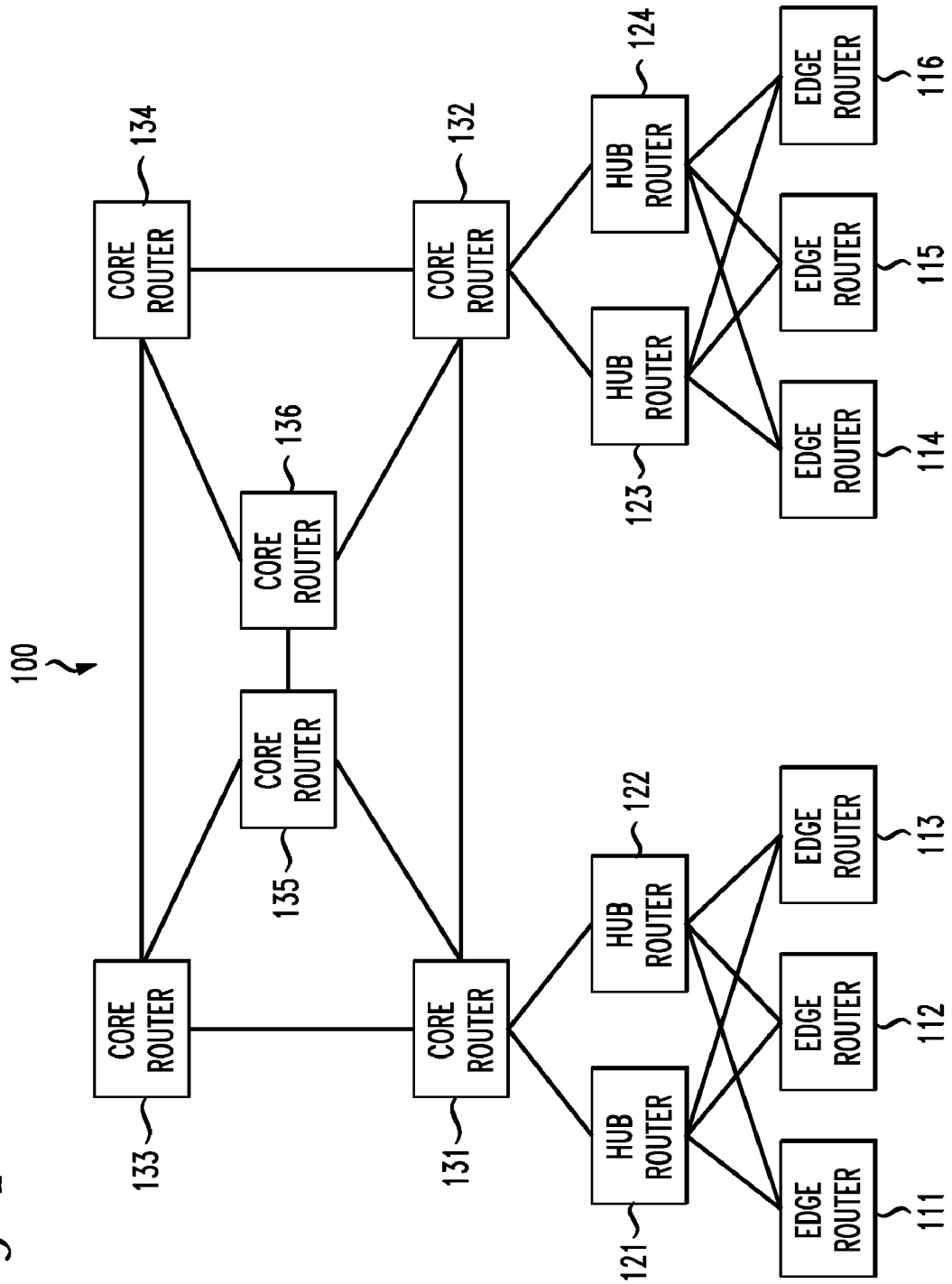
FIG. 1 depicts a network having multiple routers in accordance with a preferred embodiment of the present invention.

FIG. 1 depicts an exemplary telecommunications network 100. The network 100 can include edge routers 111-116, hub routers 121-124, and core routers 131-136, the implementation of each being generally know to those skilled in the art. Customers typically connect to the network 100 via the edge routers 111-116. For example, a customer router 141 can connect to the edge router 111 and a customer router 142 can connect to the edge router 116 to allow each customer router 141-142 to communicate with each other and with other customer routers connected to the network 100.

Data packets can be transmitted over the network 100. These data packets include, for example, a destination address, data, and a header. The destination of the data packet is generally a customer router (e.g., customer routers 141-142). The path that the data packet travels is generally formed based on the destination. Data packets generally contain a header that includes a time-to-live (TTL) value. The initial TTL value defines the maximum number of routers a packet can traverse to reach its destination. Each time the data packet passes through a router, the TTL value is decremented by one (1). If the destination is not reached before the TTL value reaches 1, the data packet is discarded. When a router receives a packet whose TTL value is 1, the router does not forward such a packet. If such a packet is destined for another router, the router that received the packet with a TTL value of one (1) drops the packet and sends a TTL expiry message to the router that originated the packet. Such expiration is referred to herein as a "TTL expiry." In this manner, the TTL value is generally set to as large a value as possible so that the TTL value of the data packet does not expire before reaching the destination. In some instances, the destination of a packet can be a directly connected router. In this case, the TTL value of the packet received by the directly connected router can be one (1) so that the data packet stops at this router. Thus, under normal operation, when the TTL value is set to its maximum value, the data packet reaches the intended destination. When a data packet does not reach the intended destination, an exception is said to have occurred.

Figure 2:
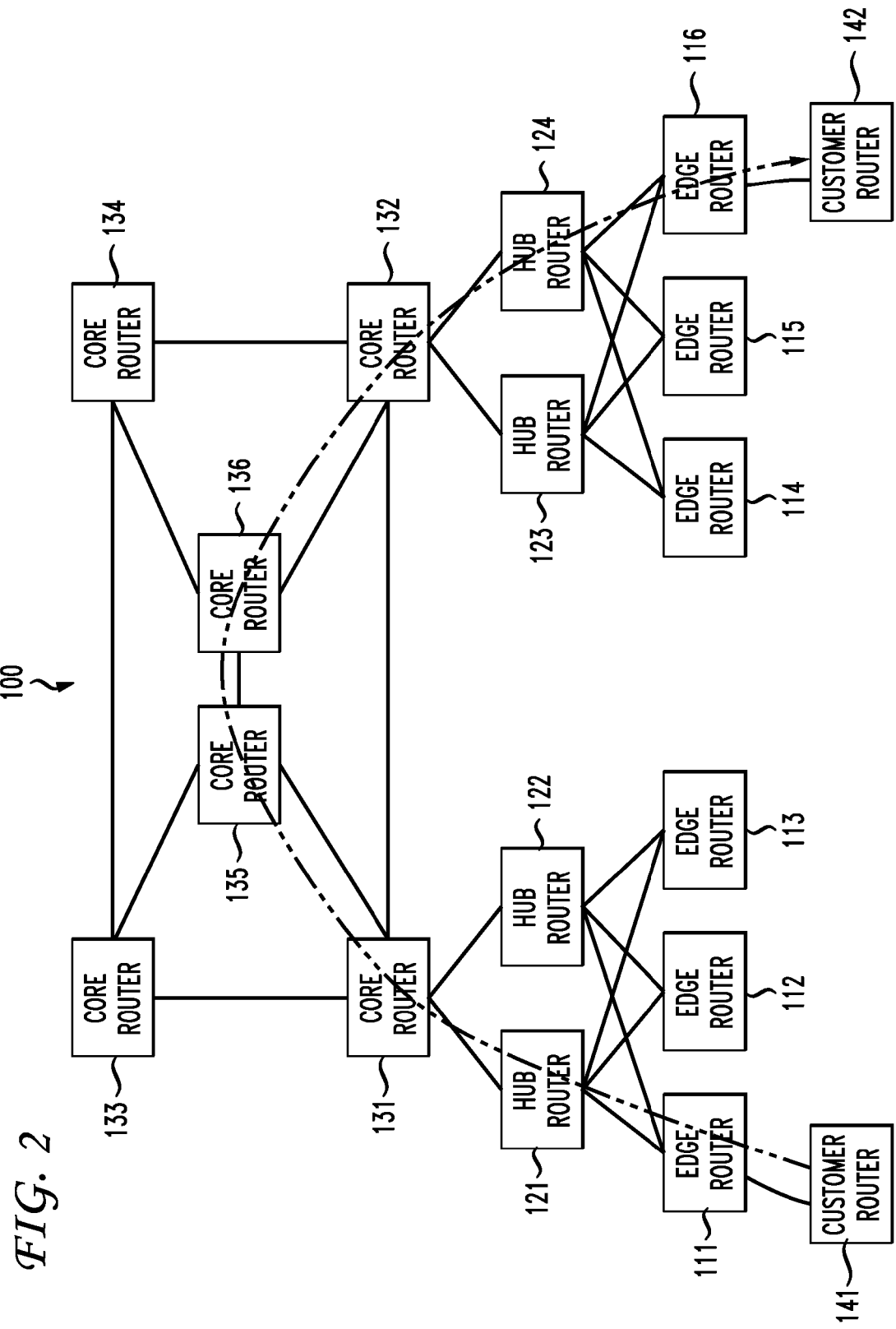
FIG. 2 illustrates a path followed by a data packet in a network that originates at the customer router and has a destination of another customer router.

For example, referring to FIG. 2, the customer router 141 may desire to transmit one or more data packets to the customer router 142. A path 210 can be formed to include the edge router 111, hub router 121, core router 131, core router 135, core router 136, core router 132, hub router 124, and edge router 116. The path 210 can be the preferred path for communications between the customer router 141 and the customer router 142. In some cases, the network may implement one or more alternative paths. So to transmit a data packet from the customer router 141 to the customer router 142, the data packet traverses eight (8) routers in the network 100. As such, the TTL value is decremented eight (8) times along the path 210 as the data packet passes through the routers on the path 210.

If the data packet is involved in a routing loop, for example, the TTL value reaches one (1) before reaching the destination, which results in a TTL expiry. A TTL expiry signal can be transmitted from the router, in which the TTL expiration occurred, to the customer router 141 to notify the customer router 141 that TTL expiry has occurred. Such expirations are exceptions and can result from configuration errors, hardware or software errors, or due to a low TTL value intentionally specified by an attacker.

Incorrectly specified TTL values can result in a TTL expiry attack on one or more routers in the network 100. For example, if multiple data packets have a TTL value so that the data packets expire in a single router, that router will experience a large quantity of TTL expiries and may become overwhelmed causing the router to operate abnormally.

The configuration errors, hardware errors, and/or software errors can result in the formation of routing loops within the network 100. Those skilled in the art will recognize that routing loops can cause TTL expiry of packets caught in the loop. This is because the TTL value is a safeguard against network meltdowns during persistent routing loops. As a result of the TTL value, when a routing loop exists, data traffic in the network does not loop endlessly. Without this safeguard routing loops could exhaust the capacity of the routers involved in the routing loop.

Figure 3A:
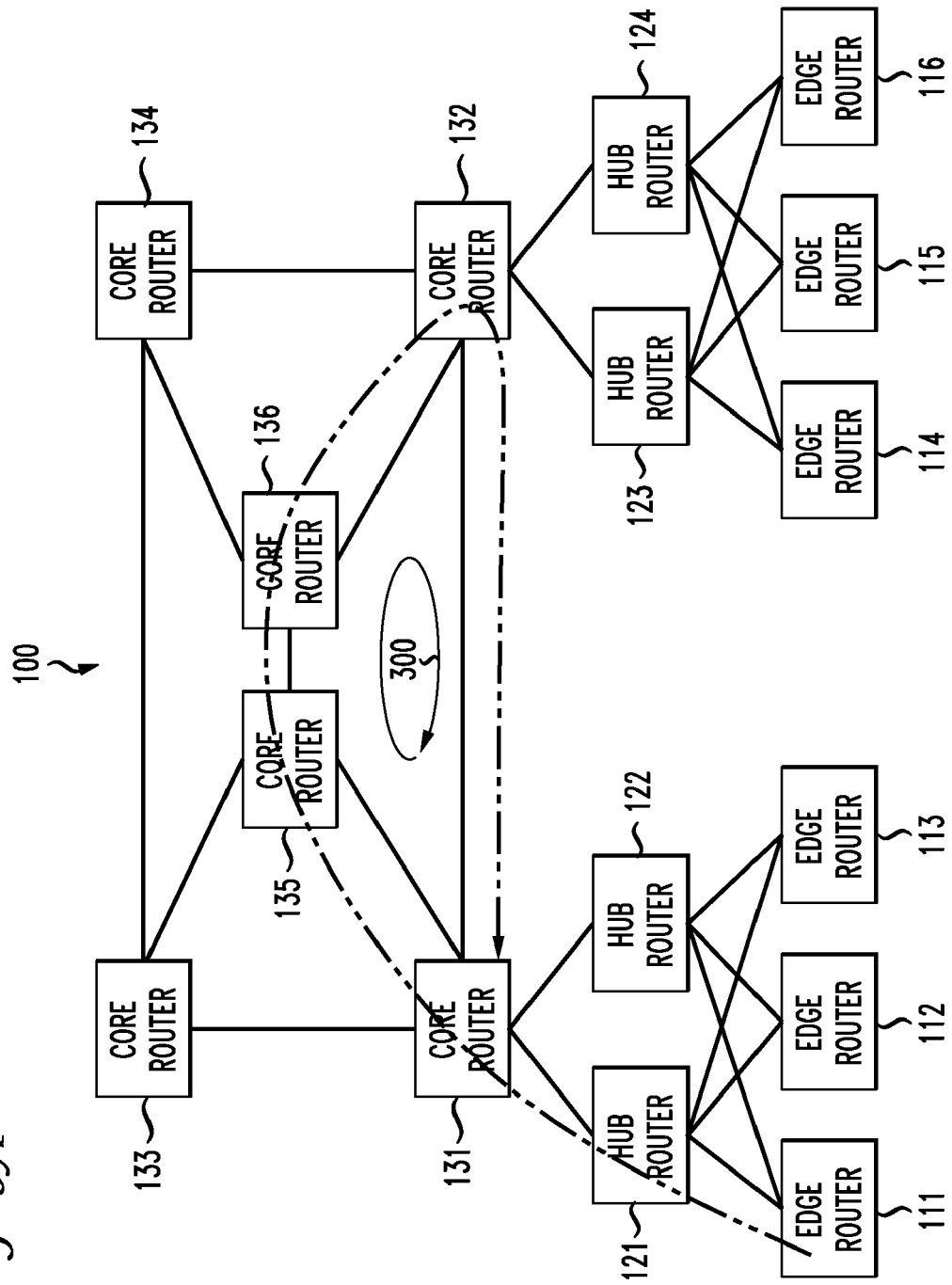
FIGS. 3A-B depict exemplary routing loops that can occur in a network.

FIG. 3A depicts an exemplary routing loop 300 that can be formed in the network 100. The routing loop 300 occurs only when the customer router 141 intends to communicate with a customer router (e.g., customer router 142) connected to edge router 116. The customer router 141 can send data packets, for example, having the customer router 142 as the destination. The data packet can pass through the edge router 111, hub router 121, core router 131, core router 135, core router 136, and core router 132, as it normally would to reach the customer router 142. However, in this example, the core router 132 can have a configuration error, hardware error, and/or a software error. As a result of this error, the core router 132 sends the data packet to the core router 131 instead of the hub router 124, which would normally receive the data packet. Upon receiving the data packet again, the core router 131 appropriately sends the data packet to the core router 135 forming the routing loop 300. In a transient routing loop, the core router 132 corrects the error in a relatively short time and data packets from the customer router 141 sent subsequent to the correction can reach the customer router 142, which represents the destination. In a persistent routing loop, however, the data packets continue around the routing loop 300 until there is a TTL expiry.

Figure 3B:
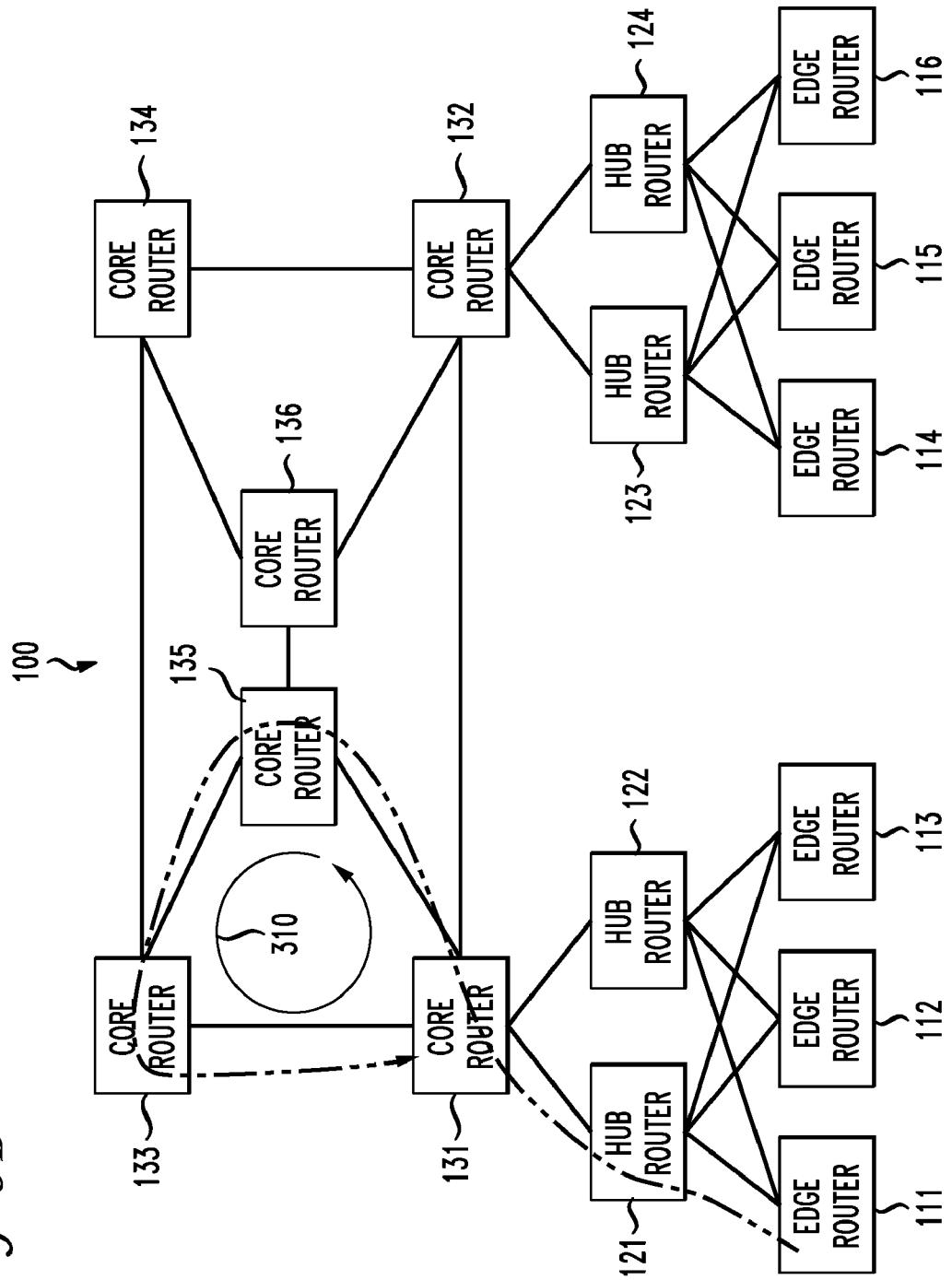

FIG. 3B depicts another exemplary routing loop 310 that can be formed in the network 100. The routing loop 310 can occur when the customer router 141 intends to communicate with customer routers connected to, for example, the edge routers 114-116. The customer router 141 can send data packets having destinations corresponding to customer routers connected to the edge routers 116. In this example, the core router 135 can have an error that causes the core router 135 to incorrectly pass the data packets, destined for the customer routers connected to the edge routers 114-116, to the core router 133. The core router 133 passes the data packets to the core router 131; thereby forming the routing loop 310.

The quantity of TTL expiries on one or more of the routers involved in a routing loop can depend on the amount of data traffic that is circulating in the routing loop. A qualitative distinction can be made between two types of persistent routing loops depending on what type of traffic is involved in the routing loop. For example, in the persistent routing loop 300 (FIG. 3A), the core router 132 incorrectly forwards traffic only meant for a single prefix reachable via edge router 116. This is possible when the network 100 uses, for example, IP routing in the core. In the routing loop 310 (FIG. 3B), the core router 135 incorrectly forwards traffic meant for multiple edge routers 114-116 due to an error involving reachability information for another core router. This is possible when the network uses, for example, MPLS routing in the core.

In a given time interval, for the routing loop 300 (FIG. 3A), a smaller quantity of TTL expiry packets would be seen on the routers along the loop, while for the routing loop 310 (FIG. 3B) there would be a large quantity of TTL expiries on the routers along the loop. Furthermore, for the routing loop 300, the TTL expiries are likely to be concentrated on a few of the routers along the loop, while for the routing loop 310 the TTL expiries can be distributed among the routers along the routing loop. This results because TTL values of packets entering the core router 131 destined to a single prefix reachable via, for example, the edge router 116 would likely have a narrower spread than those entering the core router 131 destined to many prefixes reachable via, for example, the edge routers 114-116. This is due to the disparity of the quantity of each of these types of packets.

Another cause of TTL value expiry is related to the "traceroute" operation that can be implemented by a customer router (e.g., customer routers 141-142). The traceroute operation allows customers to determine the routing and connectivity topology of their routers. The traceroute operation is based on Internet Control Message Protocol (ICMP), where each router sends an ICMP packet back to the originating router (e.g., customer routers 141-142) of each TTL expiry to notify the originating router of a TTL expiry. The traceroute operation can be used by a customer to trace a path that a data packet travels to a destination, for example, a path between two customer routers that are connected to the network 100. The traceroute operation uses ICMP and incremental TTL values to trace the path.

For example, referring to FIG. 4, the customer router 141 may wish to determine the path traveled by data packets destined for the customer router 142. In the first iteration, the customer router 141 can set the TTL value to one (1) so that the traceroute packet, D1, enters the edge router 111 and simultaneously expires. The edge router 111 sends a TTL expiry signal, d1, to the customer router 141, which uses the signal to determine the first router in the path 210 (FIG. 2). In the second iteration, the customer router 141 can set the TTL value to two (2) so that the traceroute packet, D2, passes through the edge router 111 and enters the hub router 121 where it expires. The hub router 121 sends a TTL expiry signal, d2, to the customer router 141, which uses the signal to determine the second router in the path 210. This iterative process can continue until the traceroute packet reaches the customer router 142. Customer traceroute activity can cause TTL expiry on some or all of the routers in a carrier network. In the core of a large carrier network, the amount of TTL expiry due to customer traceroute activity can be substantial.

As described above, TTL expiries can occur for several reasons, such as traceroute operations, routing loops and TTL expiry attacks. As a result, using the quantity of TTL expiries on a particular router by itself is generally not sufficient to detect the existence of a routing loop.

However, signatures can be developed for TTL expiries resulting from traceroute activity, TTL expiries resulting from routing loops and TTL expiry attacks. This results in a feasible and robust method of routing loop detection. TTL expiries from traceroute activity of customers where the source and destination of traceroute packets are outside the carrier network can provide a signature based on a principle of conservation. That is, for traceroute activity whose origin and termination are outside the carrier network, the sum of TTL expiries on incoming interfaces of a router in a given time interval substantially equals the sum of TTL expiries in the given time interval at directly connected incoming interface of other routers.

Figure 5A:
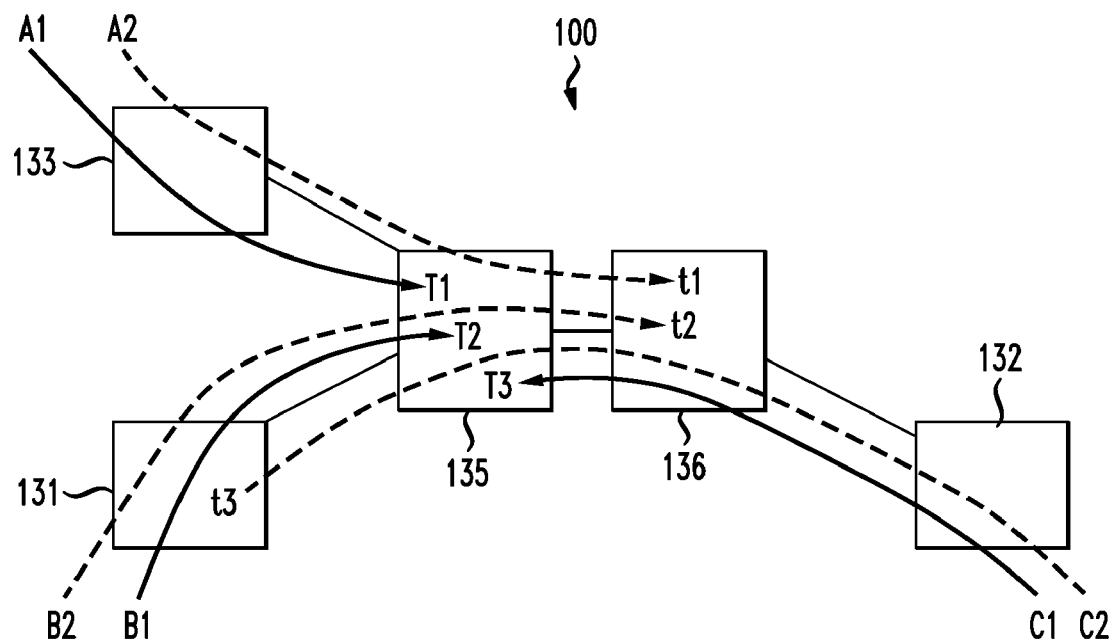
FIGS. 5A-B illustrate the TTL expiries that can occur from traceroute activity in a network.

For example, referring to FIG. 5A, the core router 135 of the network 100 can have a quantity of TTL expiries at its incoming interface as a result of the traceroute operation. In FIG. 5A, a first traceroute operation can send a traceroute packet, A1, that has a TTL value of one (1) upon entering the core router 135. As a result, a TTL expiry, T1, occurs at the incoming interface of the core router 135. In the next iteration of the first traceroute operation, a traceroute packet, A2, can be sent with a TTL value that is one (1) greater than the previous TTL value so that the traceroute packet, A2, reaches the core router 136 with a TTL value of one (1). As a result, a TTL expiry, t1, occurs at the incoming interface of the core router 136.

A second traceroute operation can be implemented by another customer router. In this case, a traceroute packet, B1, from the second traceroute operation can reach the core router 135 with a TTL value equal to one (1) resulting in a TTL expiry, T2, at the incoming interface of the core router 135. A subsequent iteration of the second traceroute operation can increment the TTL value by one (1) so that the traceroute packet, B2, reaches the core router 136 with a TTL value of one (1) resulting in a TTL expiry, t2, at the incoming interface of the core router 136.

Likewise, a third traceroute operation can be implemented by another customer router. In this case, a data packet, C1, from the third traceroute operation can reach the core router 135 with a TTL value equal to one (1) resulting in a TTL expiry, T3, at the incoming interface of the core router 135. A subsequent iteration of the third traceroute operation can increment the TTL value by one (1) so that the traceroute packet, C2, reaches the core router 131 with a TTL value of one (1) resulting in a TTL expiry, t3, at the incoming interface of the core router 131.

Based on the above example, a query of the incoming interface for the core router 135 identifies that three (3) TTL expiries (T1, T2, and T3) occurred at the incoming interface of the core router 135. Likewise, a query of the directly connected incoming interface for the core router 136 connected to the core router 135 identifies that two (2) TTL expiries (t1 and t2) occurred. A query of the core router 131 identifies one (1) TTL expiry (t3) occurred at the directly connected incoming interface of the core router 131 connected to the core router 135. Finally, a query of the directly connected incoming interface of the core router 133 connected to the core router 135 identifies that zero (0) TTL expiries occurred at the incoming interface of the core router 133. From this, the principle of conservation can be observed because as one or more traceroute operations trace a path, the sum of TTL expiries on the incoming interfaces in a router (e.g., core router 135) substantially equals the sum of TTL expiries on incoming interfaces of other routers that are directly connected to the first router (core routers 131, 133, and 136). This can be represented mathematically as follows:

$$T1+T2+T3=t1+t2+t3; \text{ or} \quad (1)$$

$$(T1+T2+T3)-(t1+t2+t3)=0. \quad (2)$$

The above equations can be represented more generally as follows:

$$\Sigma T(n)=\Sigma t(m), \quad (3)$$

where T(n) represents the TTL expiries at the incoming interface of a router during a given time interval and t(m) represents the TTL expiries occurring at other routers on the incoming interfaces directly connected to the first router during the given time interval. Using the above equations, it is possible to efficiently distinguish between TTL expiries resulting from traceroute operations and TTL expiries resulting from routing loops and TTL expiry attacks. Since traceroute operations observe the above described principle of conservation, a deviation from this indicates the existence of a routing loop or a TTL expiry attack. That is, where the sum of TTL expiries at the incoming interface of the core router 135 does not substantially equal the sum of TTL expiries at the incoming interfaces of the core routers 131, 133, and 136 directly connected to 135, it can be determined that the TTL expiries are caused by a routing loop or a TTL expiry attack. This can be represented mathematically as follows:

$$(T1+T2+\ldots+Tn)-(t1+t2+\ldots+tm)\neq 0; \text{ or} \quad (4)$$

$$\Sigma T(n)\neq\Sigma t(m). \quad (5)$$

Figure 5B:
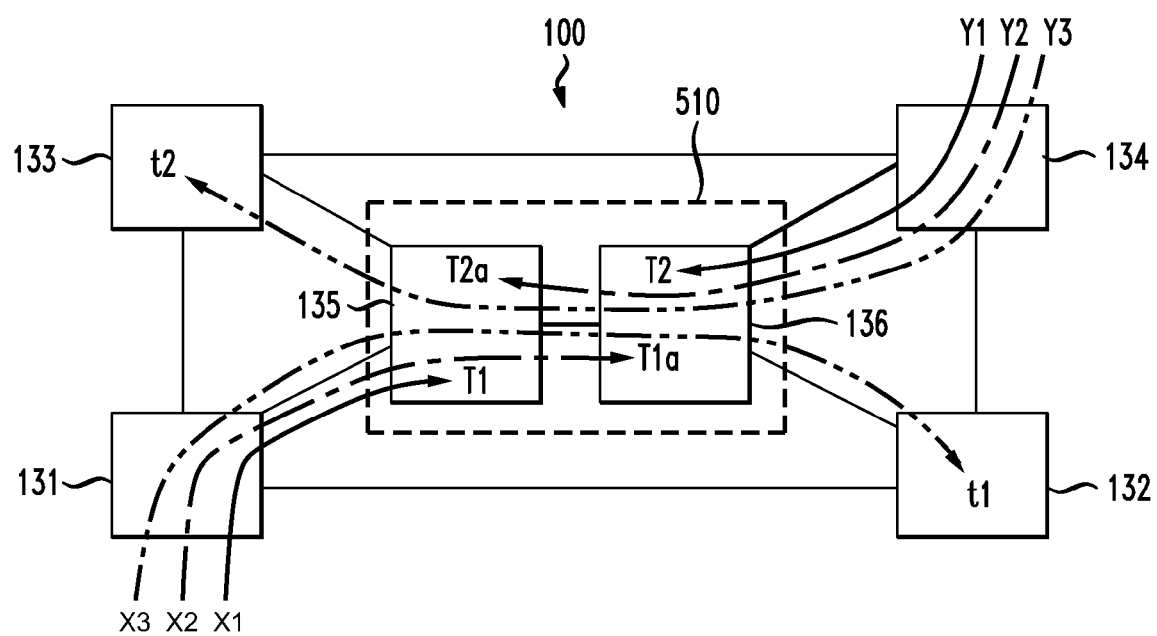

The principle of conservation for traceroute activity can be used for a single router, as discussed above with respect to FIG. 5A, or for a group of routers. For example, referring to FIG. 5B, a group 510 of directly connected routers including the core routers 135 and 136 can be defined. Traceroute operations can be used to define one or more paths that include the core routers 135 and 136. For example, a first traceroute can send a traceroute packet, X1, for which the TTL value equals one (1) upon entering the core router 135. As a result, a TTL expiry, T1, occurs at the incoming interface of the core router 135. In the next iteration of the first traceroute operation, a traceroute packet, X2, can be sent with a TTL value that is incremented by one (1) so that the traceroute packet, X2, reaches the core router 136 with a TTL value of one (1). As a result, a TTL expiry, T1a, occurs at the incoming interface of the core router 136. On the following iteration of the traceroute operation, the TTL value can again be incremented by one (1) so that the traceroute packet, X3, has a TTL value of one when entering the core router 132. This results in a TTL expiry, t1, at the incoming interface of the core router 132.

Likewise, a second traceroute operation can be implemented by another customer router. In this case, a traceroute packet, Y1, from the second traceroute operation can reach the core router 136 with a TTL value equal to one (1) resulting in a TTL expiry, T2, at the incoming interface of the core router 136. A subsequent iteration of the second traceroute operation can increment the TTL value by one (1) so that the traceroute packet, Y2, reaches the core router 135 with a TTL value of one (1) resulting in a TTL expiry, T2a, at the incoming interface of the core router 135. On the following iteration of the second traceroute operation, the TTL value can again be incremented so that the traceroute packet, X3, reaches the core router 133 with a TTL value of one (1). This results in a TTL expiry, t2, at the incoming interface of the core router 133. Using equation (3) for the group 510 of routers yields the following equation:

$$T1+T2=t1+t2. \quad (6)$$

Thus, the sum of TTL expiries occurring at the incoming interfaces of the routers (e.g., core routers 135 and 136) in the group 510 is substantially equal to the sum of the TTL expiries at the directly connected incoming interfaces of the routers (e.g., core routers 13 1-134) that connect to the routers in the group 510. The number of routers in the group can be specified so that one or more routers are included in the group. The size of a group can be statically assigned or dynamically assigned.

The above equations (1) through (3) and (6) represent an ideal condition where the only traceroute activity in the network is due to customer traceroutes where the origin and destination of traceroute packets lie outside the carrier network and where any ongoing traceroute activity while the traceroute counts are being obtained is discounted. However, networks may not follow this ideal case. Rather, there can be a small difference between the sum of TTL expiries, T, and the sum of TTL expiries, t, due to traceroute activity of operators of the carrier network where the origin and destination of traceroute packets are within the carrier network and also, due to on going traceroute activity while traceroute counts are being obtained. As a result, the condition where the sum of TTL expiries in a router (e.g., core router 135) does not equal the sum of TTL expiries in other routers (core routers 131, 133, and 136) connected to the router may not indicate the existence of a routing loop or a TTL expiry attack, but rather some mismatch in the network due to afore-mentioned causes. To account for this the above equations are relaxed by introducing a threshold difference, d. The threshold difference, d, requires the difference between the sum of TTL expiries, T, on incoming interfaces of a router (e.g., core router 135) to differ from the sum of the TTL expiries, t, on incoming interfaces of other routers (e.g., core routers 131, 133, and 136) that directly connect to the router by an amount that is less than the threshold difference, d, before it can be determined that no routing loop or TTL expiry attacks exist. This can be represented mathematically as follows:

$$|\Sigma T(n)-\Sigma t(m)|<d. \qquad(7)$$

Thus, if the difference between the sums exceeds this threshold difference, it can be determined that a routing loop or TTL expiry attack exists.

Figure 6:
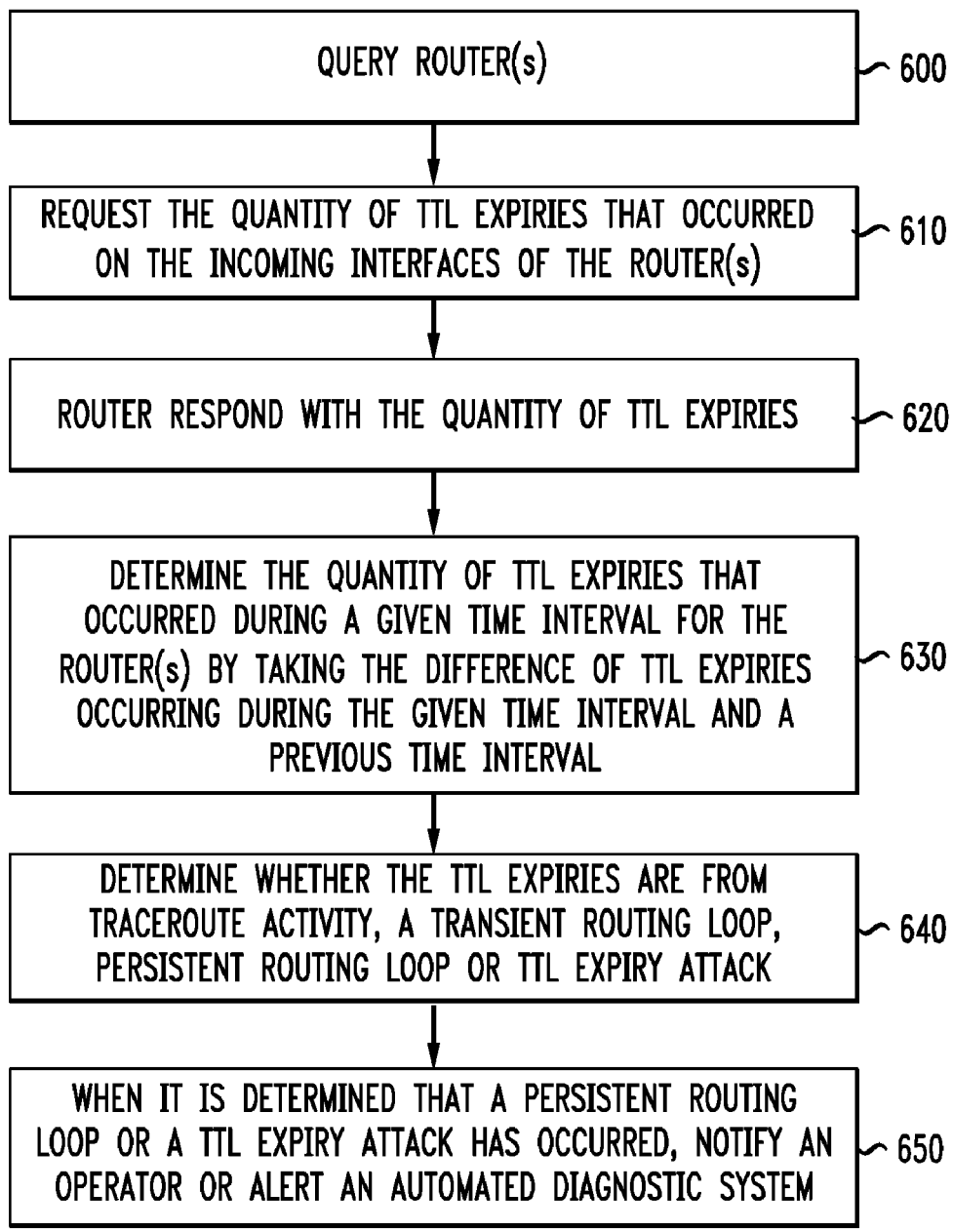
FIG. 6 is a flow diagram that illustrates a preferred embodiment of the present invention for detecting a routing loop or a TTL expiry attack.

FIG. 6 is a flow diagram illustrating a preferred embodiment of the present invention for detecting a routing loop or a TTL expiry attack. A monitoring unit can query one or more routers in a network using techniques known to those skilled in the art (step 600). Some or all of the routers in the network can be configured to be responsive to this query. The query can request a quantity of TTL expiries that occurred in one or more routers (step 610). The query can request the quantity of TTL expiries occurring at the incoming interface of routers (e.g., the core routers 131-136) in a network. In this manner, the routers of a network can be monitored to periodically track the quantity of TTL expiries occurring in the network. For example, the monitoring unit can query the routers every 5 minutes. The routers can respond to the query by providing the monitoring unit with the quantity of TTL expiries for each router (step 620). The monitoring unit can determine the TTL expiries for incoming interfaces that occurred during the current time interval by taking the difference between the most recent and previous TTL expiry counts that are reported (step 630). Generally, routers report the cumulative TTL expiry counts. The monitoring unit can use these quantities to determine whether the TTL expiries for one or more of the routers is from traceroute activity, a routing loop, or a TTL expiry attack (step 640). In some embodiments, the monitoring unit uses TTL expiry quantities from multiple time intervals to distinguish between persistent and transient routing loops. For example, if the monitoring unit determines that a routing loop existed in a time interval, but did not exist in a subsequent time interval, the monitoring unit can determine that a transient routing loop existed. When it is determined that a persistent routing loop or TTL expiry attack has occurred, a notification can be issued to preferably notify an operator or an automated diagnostic system (step 650). The operator may be able to discern visual patterns easily and diagnose the situation more efficiently.

Since networks can operate dynamically, the quantities of TTL expiries can change between queries and transient routing loops can be resolved. Preferably, the monitoring unit captures the TTL expiries on router interfaces in a substantially simultaneous manner. However, those skilled in the art will recognize that such captures are not required to occur simultaneously. Substantially simultaneous captures can be achieved using multiple independent scripts known to those skilled in the art. The scripts can poll the routers at regular or irregular intervals to request the quantity of TTL expiries occurring at the routers. The threshold difference can be used to take into account the dynamic nature of TTL expiries and non-simultaneous captures by allowing a specified threshold difference between the sums before determining a persistent, rather than a transient routing loop or TTL expiry attack is occurring. In addition, by periodically monitoring the routers, the monitoring unit can distinguish between transient routing loops that are resolved in a relatively short period of time and persistent routing loops that continue for a relatively long period of time. Therefore, the preferred embodiments of the present invention can isolate the persistent routing loops, while disregarding the transient routing loops.

The monitoring unit can also develop historical data associated with one or more of the routers in the network based on queries that were made to the routers. Historical data represents data from past operation of the routers. The quantity of TTL expiries can be compared to quantities of TTL expiries from historical data, which can provide further evidence of a persistent, rather than a transient routing loop or a TTL expiry attack.

The resolution for detecting routing loops can depend on the number of routers included in a group. For example, the group 510 that includes the core routers 135 and 136 can determine that the core router 135 and/or the core router 136 are involved in a routing loop. However, if the group includes core routers 131-136, it can be determined that some, none, or all of the routers are involved in a routing loop, but it may not be possible to determine which of the routers are actually involved in the routing loop.

In some embodiments, the monitoring unit can use a group including a large number of routers to monitor a certain area in the network. Once the monitoring unit determines that one or more of the routers in the group are involved in a routing loop, the monitoring unit may reduce the number of routers in the group to further isolate the routing loop to a smaller number of routers. This process can be performed iteratively until the routers involved in the routing loop are found.

Figure 7:
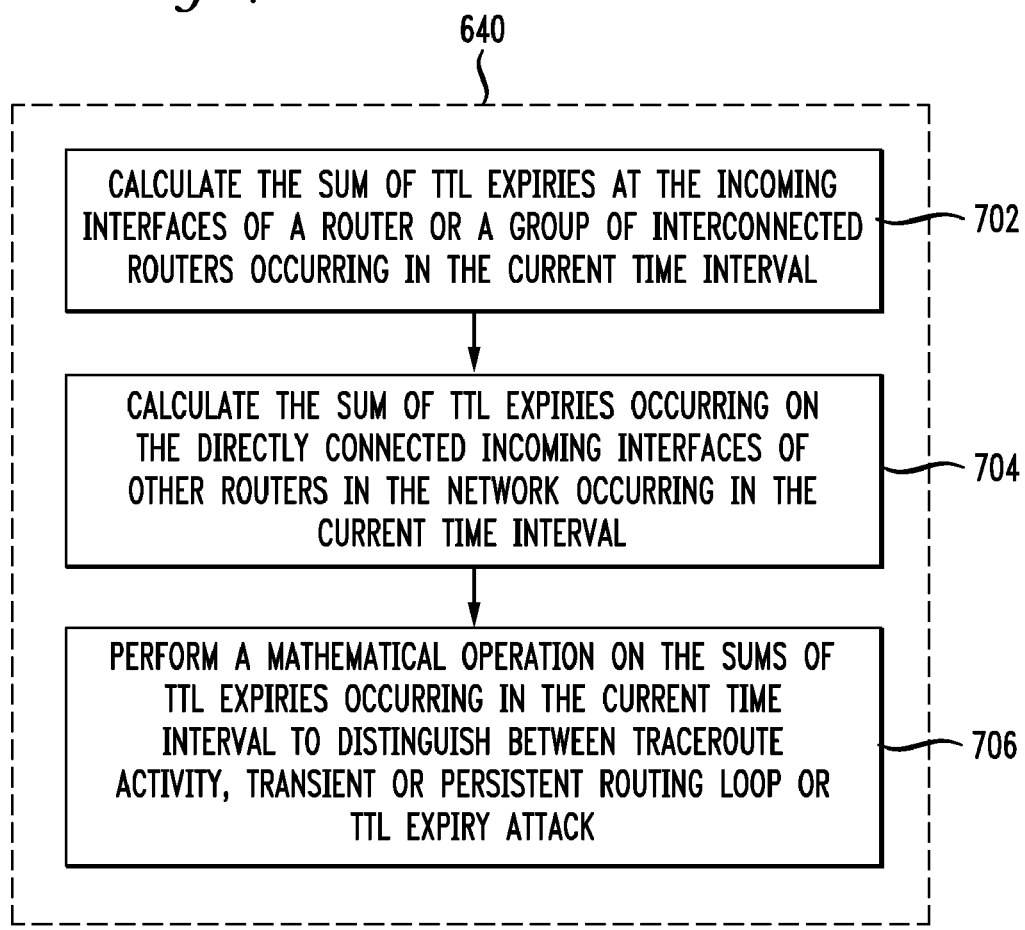
FIG. 7 is a flow diagram illustrating a preferred embodiment for determining whether the TTL expiries are the result of traceroute activity, a routing loop, or a TTL expiry attack.

FIG. 7 is a flow diagram illustrating a preferred embodiment for determining whether the TTL expiries are the result of traceroute activity, a routing loop, or a TTL expiry attack. Upon receiving the quantity of TTL expiries from the routers, the monitoring unit can calculate the sum of TTL expiries at the incoming interface of a router or at the incoming interface of a group of routers occurring in the current time interval (step 702). In the case where a single router is monitored, the quantity of TTL expiries received by the monitoring unit may be a pre-calculated sum of TTL expiries for that router. The sum of TTL expiries at the incoming interfaces of other routers that are directly connected to the router or group of routers is also calculated (step 704). A mathematical operation is performed on the sums to distinguish between traceroute activity and a routing loop or a TTL expiry attack (step 706).

Figure 8:
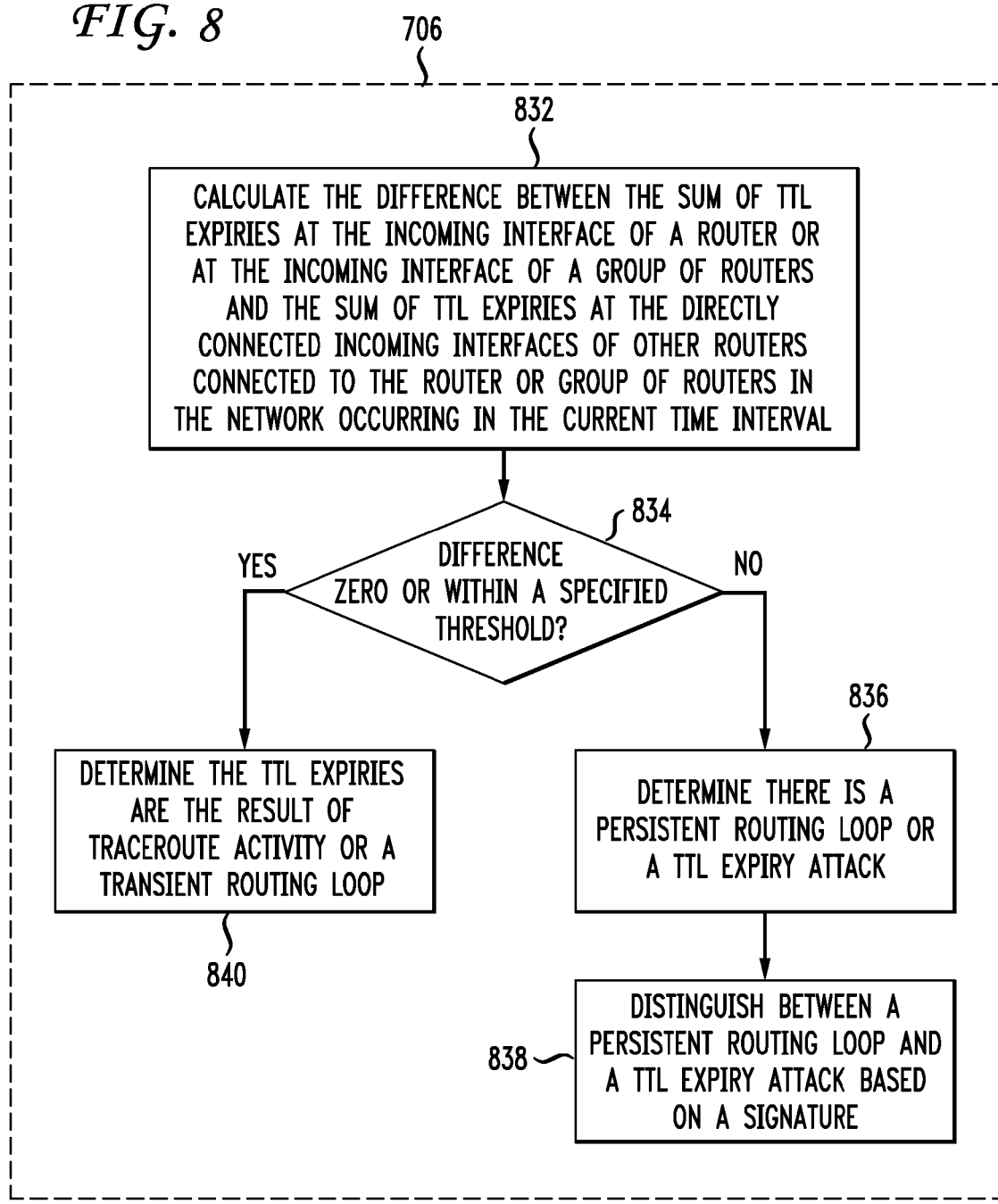
FIGS. 8-9 are flow diagrams illustrating the preferred mathematical operations performed to determine whether there is traceroute activity, a routing loop, or a TTL expiry attack.

Referring to FIG. 8, the mathematical operation preferably is in the form of a difference between the sum of TTL expiries at the incoming interfaces of a router (e.g., core router 135) or at the incoming interfaces of a group (e.g., group 510) of routers and the sum of TTL expiries at the directly connected incoming interfaces of other routers (e.g., core routers 131-134) in the network occurring during the current time interval (step 832). If the difference is not zero or exceeds a specified threshold (step 836), the monitoring unit determines there is a persistent routing loop or a TTL expiry attack (step 836). A signature may be used to distinguish between a persistent routing loop and a TTL expiry attack (step 838). Otherwise, the monitoring unit determines that the TTL expiries are the result of traceroute activity or a transient routing loop (step 840).

Figure 9:
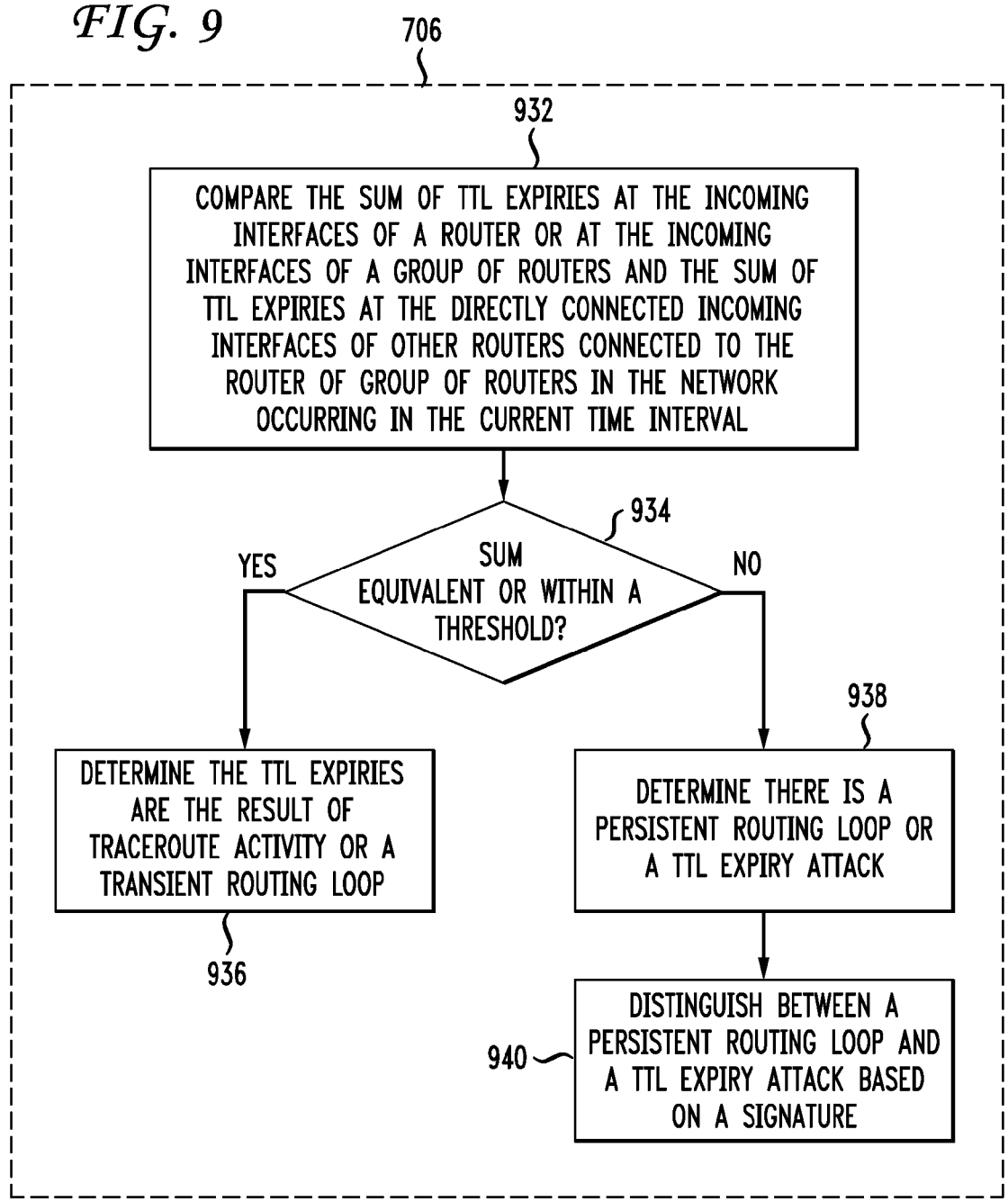

Alternatively, referring to FIG. 9, the mathematical operation can be in the form of a comparison between the sum of TTL expiries at the incoming interface of a router (e.g., core router 135) or at the incoming interface of a group (e.g., group 510) of routers and the sum of TTL expiries at the directly connected incoming interfaces of other routers (e.g., core routers 131-134) in the network (step 932) occurring in the current time interval. If the sums are equal or within a threshold (step 934), the monitoring unit determines that the TTL expiries are the result of traceroute activity or a transient routing loop (step 936). Otherwise, the monitoring unit determines there is a persistent routing loop or a TTL expiry attack (step 938). A signature may be used to distinguish between a persistent routing loop and a TTL expiry attack (step 940).

The processes depicted in FIG. 6-9 can be preformed to monitor routers of interest in the network. For example, the processes in FIGS. 6-9 can be implemented for the core routers 131-136 so that routing loops and TTL expiry attacks can be detected for the core routers 131-136. In some instances, the number of routers that are monitored can be varied. For example, a service provider may wish to detect a routing loop in a network and may wish to isolate each of the routers involved in the routing loop to perform further diagnostic and/or resolve the routing loop. To achieve this, the monitoring unit may monitor some or all of the routers in the network and vary the resolution of monitoring using router groups until a region in the network is identified as not satisfying the equations described above.

Once the monitoring unit determines that the TTL expiries are due to a persistent routing loop or TTL expiry attacks, the monitoring unit can further determine whether there is a persistent routing loop or a TTL expiry attack automatically based on signatures. A signature represents a pattern in the network of routers that do not satisfy the principle of conservation associated with traceroute activity, which can be represented by equations (3) or (7). Alternatively, the monitoring unit can provide an operator with a textual and/or graphical depiction of the signature on a display and the operator can manually determine whether a persistent routing loop or a TTL expiry attack exists. In the case of a graphical depiction, the routers that are monitored may be depicted and the depictions may be annotated with the sum of TTL expiries that have occurred on each corresponding router in the current time interval. The annotation may be textual and/or graphical. Examples of graphical annotations can include weighting the lines connecting the routers as well as the borders of the routers based on the sum of TTL expiries experience, providing a color scheme where the color of the routers are based on the relative level of TTL expiries occurring at each router, and/or highlighting the routers with TTL expiry exceptions.

Figure 10:
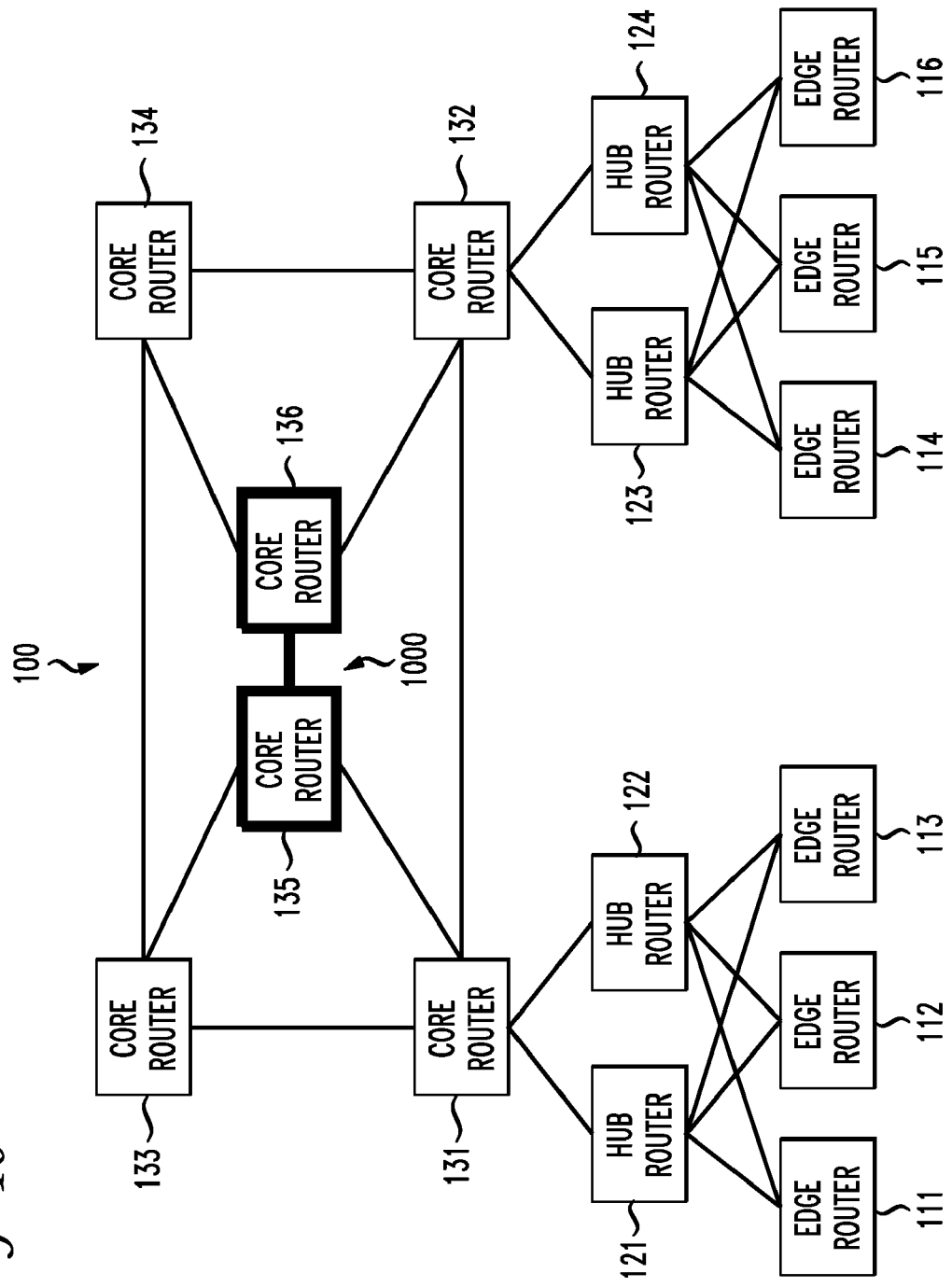
FIGS. 10-12 depict various signatures that can be used to determine whether a routing loop or a TTL expiry attack exists.

For example, referring to FIG. 10, the service provider can detect that TTL expiries are not the result of traceroute activity, as discussed above, and then can determine which of the routers are involved in the TTL expiries exceptions. In FIG. 10, the monitoring unit determine that the core routers 135 and 136 do not follow the principle of conservation associated with traceroute activity, and therefore do not satisfy equation (3) or (7). As a result, the monitoring unit determines that the core routers are involved in a routing loop or a TTL expiry attack based on a signature 1000. Based on the signature 1000 of the TTL expiries, the monitoring unit can automatically determine or can display the signature 1000 (graphical or textually) so that an operator can manually determine whether the signature 1000 corresponds to a routing loop or TTL expiry. In this case, since two adjacent routers have been identified, the monitoring unit or the operator can determine that a routing loop has formed between the core routers 135 and 136. Additionally, the core routers 135 and 136 and the connection between the core routers 135 and 136 can have a weighted (thicker) border than the other routers to identify the level of TTL expiries occurring at the core routers 135 and 136. The weighting can vary based on the sum of TTL expiries at each monitored router.

Figure 11:
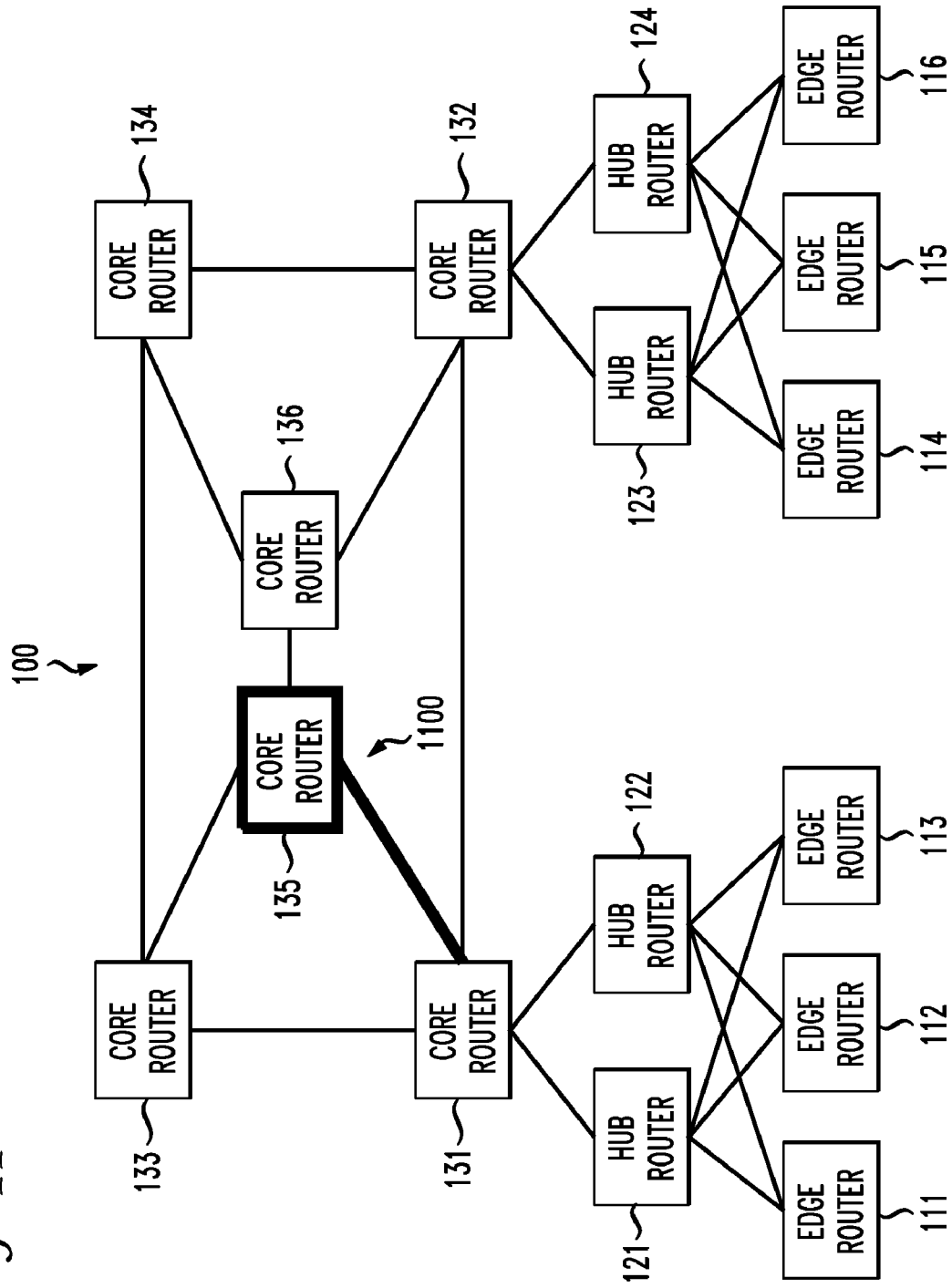

FIG. 11 depicts an exemplary signature 1100 of a TTL expiry attack. In FIG. 11, the core router 135 has been identified as not satisfying equation (3) or (7). However, no other routers, adjacent or otherwise, have been identified for not satisfying equation (3) or (7). Thus, the monitoring unit or the operator with the assistance of the monitoring unit or an operator can determine that there was a TTL expiry attack based on the signature 1100. The core router 135 may be highlighted or otherwise annotated on the display. As a result, the monitoring unit can identify routers undergoing TTL expiry attacks using the signature.

Figure 12:
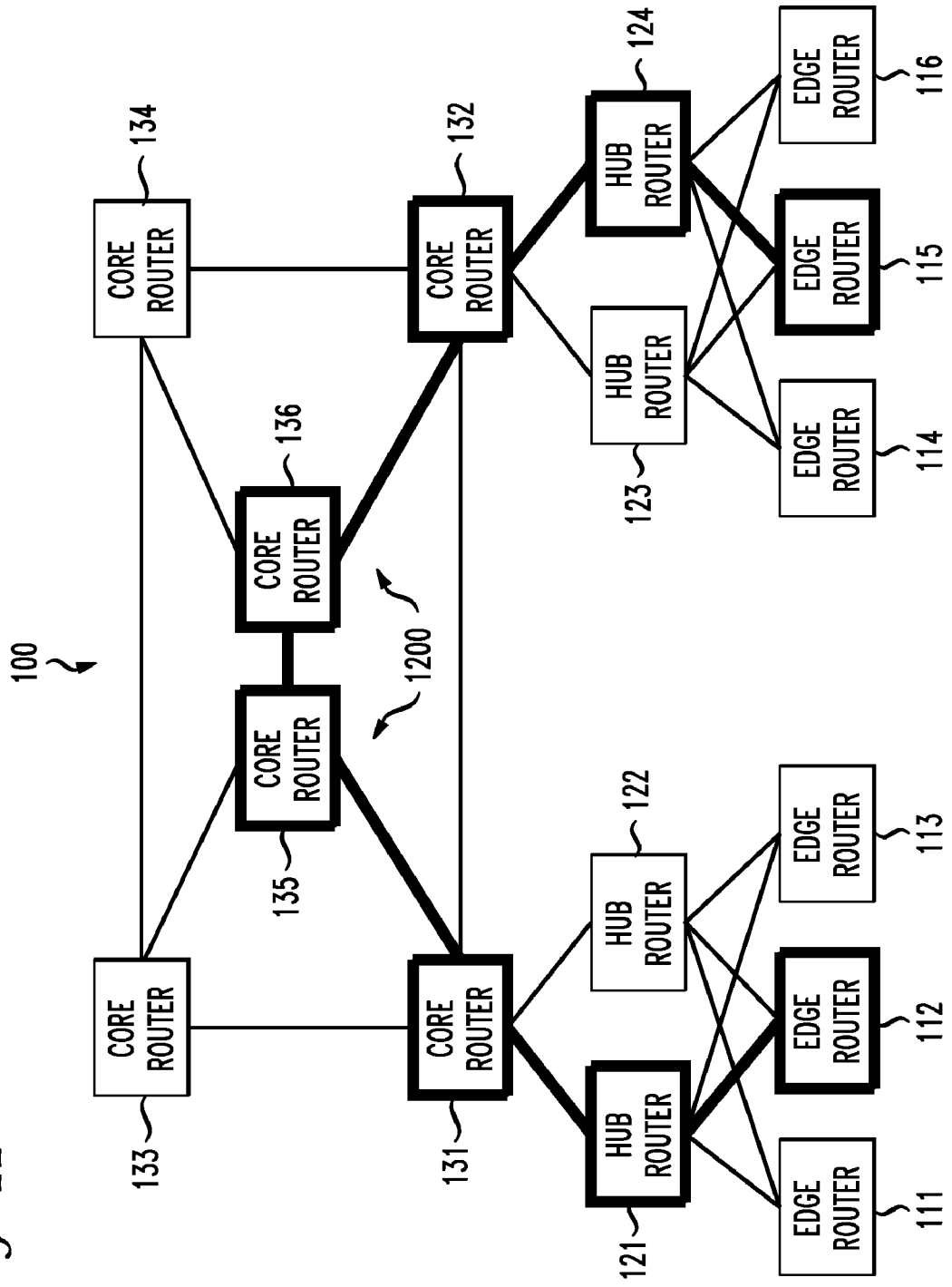

FIG. 12 depicts an exemplary signature 1200 of a routing loop that may involve multiple networks some of which are external to the service provider's network 100. In FIG. 12, edge routers 112 and 115, hub routers 121 and 124, and core routers 131, 132, 135, and 136 are identified as not satisfying equation (3) or (7). Using this, the monitoring unit or the operator with the assistance of the monitoring unit identifies a group of sequentially adjacent routers having the signature 1200 depicted in FIG. 12. Based on this signature 1200, the monitoring unit and/or the operator with the assistance of the monitoring unit can determine that these routers are involved in a routing loop that extends into multiple networks. The signature 1200 may be depicted using a color scheme where the sum of the TTL expiries correspond to specified colors or may be annotated in any suitable manner.

Figure 13:
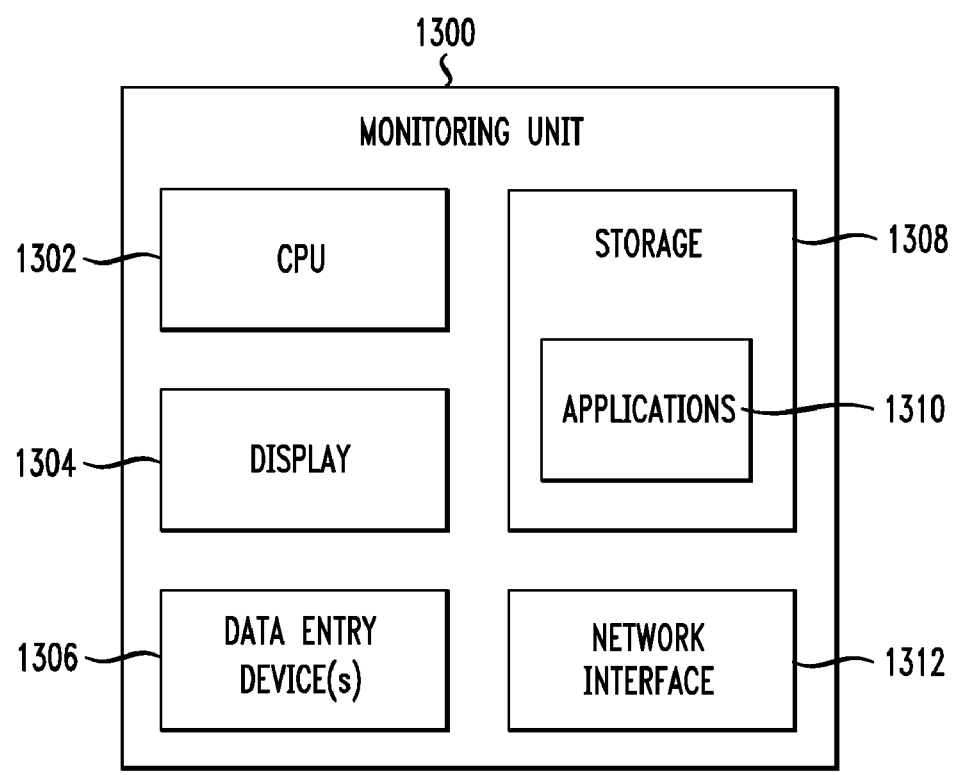
FIG. 13 depicts a preferred embodiment of a monitoring unit for implementing preferred embodiments of the present invention.

With reference to FIG. 13, the monitoring unit 1300 can be formed of a computing device, such as a mainframe, personal computer (PC), laptop computer, workstation, or the like. In the illustrated embodiment, the monitoring unit 1300 includes a central processing unit (CPU) 1302 and a display device 1304. The display device 1304 enables the monitoring unit 1300 to communicate directly with a user through a visual display. The monitoring unit 1300 can further include data entry device(s) 1306, such as a keyboard, touch screen, and/or mouse. The monitoring unit 1300 can include storage 1308 for storing data and instructions. The storage 1308 can include such technologies as a floppy drive, hard drive, tape drive, Flash drive, optical drive, read only memory (ROM), random access memory (RAM), and the like.

Applications, such as an application 1310 for detecting routing loops and TTL expiry attacks based on TTL expiries as described above, can be resident in the storage 1308. The application 1310 can include instructions for implementing those embodiments depicted in FIGS. 1-12. The storage 1308 can be local or remote to the monitoring unit 1300. The monitoring unit 1300 preferably includes a network interface 1312 for communicating with the network 100. The CPU 1302 operates to run the application in storage 1308 by performing instructions therein and storing data resulting from the performed instructions, which may be presented to the user via the display 1304. The data can include the quantity of TTL expiries occurring at the monitored routers which can be depicted textually or graphically to identify a signature for the operator The disclosed preferred embodiments can be used to monitor a set of inter-connected routers in a large carrier network to detect routing loops involving any of the monitored routers. The preferred embodiments avoid the "combinatorial explosion" of having to send probes from every edge router to every other edge router to detect routing loops involving the core routers. In principle, the preferred embodiments can be used to monitor all routers in a network since only the TTL expiry counts on the interfaces are needed.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A method of detecting routing loops in a network comprising:

determining, by a monitoring unit, whether a routing loop exists based on a relationship between a quantity of time-to-live (TTL) expiries associated with at least one first router in a network and a quantity of TTL expiries associated with at least one second router in the network, wherein determining, by the monitoring unit, whether a routing loop exists includes identifying a signature based on the quantities of TTL expiries occurring on the at least one first router and the at least one second router and distinguishing between a routing loop and a TTL expiry attack based on the signature.

2. The method of claim 1, wherein the quantity of TTL expiries associated with the at least one first router in the network comprises a first sum of TTL expiries and the quantity of TTL expiries associated with at least one second router in the network comprises a second sum of TTL expiries.

3. The method of claim 2, wherein determining whether a routing loop exists comprises:
calculating a difference between the first sum and the second sum, the method further comprising determining that a routing loop exists in response to the difference exceeding a predetermined value.

4. The method of claim 1, further comprising:
determining whether a TTL expiry attack exists based on the quantities of TTL expiries associated with the at least one first router and the at least one second router.

5. The method of claim 1, wherein the at least one second router is operatively coupled to the at least one first router.

6. A non-transitory computer-readable storage medium comprising instructions, wherein execution of the instructions by at least one computing device detects a routing loop in a network by:
determining whether a routing loop exists based on a relationship between a quantity of time-to-live (TTL) expiries associated with at least one first router in a network and a quantity of TTL expiries associated with at least one second router in the network,
wherein determining whether a routing loop exists includes identifying a signature based on the quantities of TTL expiries occurring on the at least one first router and the at least one second router and distinguishing between a routing loop and a TTL expiry attack based on the signature.

7. The non-transitory medium of claim 6, wherein the quantity of time-to-live (TTL) expiries associated with the at least one first router in the network comprises a first sum of TTL expiries and the quantity of TTL expiries associated with at least one second router in the network comprises a second sum of TTL expiries.

8. The non-transitory medium of claim 7, wherein determining whether a routing loop exists comprises:
calculating a difference between the first sum and the second sum, the medium further comprising determining that a routing loop exists in response to the difference exceeding a predetermined value.

9. The non-transitory medium of claim 6, further comprising:
determining whether a TTL expiry attack exists based on the quantities of TTL expiries associated with the at least one first router and the at least one second router.

10. The non-transitory medium of claim 6, wherein the at least one second router is operatively coupled to the at least one first router.

11. The non-transitory medium of claim 6, wherein the determining comprises:
distinguishing between a persistent and transient routing loop based on the TTL expiry quantities associated with a plurality of time intervals.

12. The non-transitory medium of claim 6, wherein determining whether a routing loop exists comprises:
comparing the quantity of TTL expiries associated with the at least the one first router to quantities of TTL expiries from historical data to distinguish between a persistent routing loop, a transient routing loop, or a TTL expiry attack.

13. The non-transitory medium of claim 6, further comprising:
determining a TTL expiry attack occurred based on the quantities of TTL expiries associated with the at least one first router and the at least one second router; and
determining the routers involved in a TTL expiry attack in response to a signature.

14. A system for detecting routing loops in a network having a plurality of routers, the system comprising:
a computing device configured to determine whether a routing loop exists based on a relationship between a quantity of TTL expiries associated with at least one first router and a quantity of TTL expiries associated with at least one second router in the network,
wherein the computing device identifies a signature based on the quantity TTL expiries associated with the at least one first router and the quantity of TTL expiries occurring on the at least one second router and distinguishes between a routing loop and a TTL expiry attack in response to the signature.

15. The system of claim 14, wherein the quantity of TTL expiries associated with at least one first router in the network comprises a first sum of TTL expiries and the quantity of TTL expiries associated with at least one second router in the network comprises a second sum of TTL expiries.

16. The system of claim 15, wherein the computing device calculates a difference between the first sum and the second sum and determines a routing loop exists in response to the difference exceeding a predetermined value.

17. The system of claim 14, wherein the computing device is associated with the at least one first router and the at least one second router associated with a plurality of time intervals, the computing device distinguishing between a persistent and transient routing loop based on the TTL expiry quantities associated with the plurality of time intervals.

* * * * *